United States Patent [19]

Ebbo

[11] Patent Number: 5,758,358
[45] Date of Patent: May 26, 1998

[54] METHOD AND SYSTEM FOR RECONCILING SECTIONS OF DOCUMENTS

[75] Inventor: David S. Ebbo, Redmond, Wash.

[73] Assignee: Microsoft Corporation, Redmond, Wash.

[21] Appl. No.: 593,744

[22] Filed: Jan. 29, 1996

[51] Int. Cl.$^6$ .................................................. G06F 17/30
[52] U.S. Cl. ........................................ 707/203; 707/511
[58] Field of Search .................................. 395/616, 617, 395/619, 701, 712, 772; 707/203, 511

[56] References Cited

U.S. PATENT DOCUMENTS

| | | | |
|---|---|---|---|
| 5,089,956 | 2/1992 | MacPhail | 395/601 |
| 5,101,345 | 3/1992 | MacPhail | 395/601 |
| 5,179,718 | 1/1993 | MacPhail | 395/800 |
| 5,317,729 | 5/1994 | Mukherjee et al. | 395/603 |
| 5,485,621 | 1/1996 | Schwanke | 395/703 |
| 5,499,365 | 3/1996 | Anderson et al. | 395/619 |
| 5,535,386 | 7/1996 | Wang | 395/619 |
| 5,574,898 | 11/1996 | Leblang et al. | 395/601 |
| 5,600,834 | 2/1997 | Howard | 395/617 |

OTHER PUBLICATIONS

Change Control User's and Reference Manual, Software Release 6.0, Sep. 1987, © Context Corporation, all pages.

*Primary Examiner*—Paul V. Kulik
*Attorney, Agent, or Firm*—Jones & Askew, LLP

[57] ABSTRACT

Reconciliation of corresponding groupings of data for processing by application programs ("sections") which are contained within files ("documents") is performed using history lists. In particular, a section in one document which corresponds to a section in another document is reconciled. Each section has a history list which identifies versions of that section. The reconciliation is performed by using the history lists to compare versions of corresponding sections in order to determine which section has been modified. When one of the corresponding sections has been modified and the other has not been modified, the unmodified section is modified with the other section. When both sections have been modified, then the user is provided with options for reconciling the sections. In addition, when one document has a new section which is not in the other document, the new section is added to the other document.

19 Claims, 9 Drawing Sheets

| | Entry Identifier | Entry Value | |
|---|---|---|---|
| 308 | Section GUID | 2468 | 305 |
| 310 | fReconciled | TRUE | |
| 312 | Number of Versions | 3 | |
| 314 | Version GUID 1 | 3298 | 306 |
| 316 | Version GUID 2 | 1126 | |
| 318 | Version GUID 3 | 9267 | |

METHOD AND SYSTEM FOR RECONCILING SECTIONS OF DOCUMENTS

TECHNICAL ENTRY

The present invention relates generally to data processing systems and, more particularly, to reconciling sections of documents.

BACKGROUND OF THE INVENTION

A typical network includes a central computer with a central memory, containing central files, and includes several local computers that each have a local memory, containing local files. Through the use of a network, a user of the central computer or a user of one of the local computers may access both the central files and the local files. In addition, a user of one of the local computers may copy a central file to a local memory as a local file. The local file corresponds to the central file. Then, the user may modify the local file in the local memory or may modify the central file in the central memory. When either the local file or the central file is modified, they are no longer in synch (i.e., contain the same modifications) Moreover, after modifying a file, a user may save the file in memory. Typically, a conventional system stores a date and time along with the file to indicate the last time the file was saved.

Some conventional systems offer a method of reconciling a central file and a local file which correspond. The reconciliation process updates a file based on the modifications made in the corresponding file so that the two files are in synch. The updating is typically done by replacing the unmodified file with the modified file (i.e., by copying the modified file over the unmodified file). Typically, a conventional system determines whether the local file or the central file has been modified based on the last date and time that the files were saved. Then, the modified file is copied over the corresponding file.

SUMMARY OF THE INVENTION

In accordance with a first aspect of the present invention, a method is practiced in a data processing system. A first document is provided which contains a first section which constitutes a grouping of data for processing by an application program. In addition, a first history list is provided which is associated with the first section and which identifies modifications made in the first section. Also, a second document is provided that contains a second section which constitutes a grouping of data for processing by an application program. Moreover, a second history list is provided which is associated with the second section and which identifies modifications made in the second section. The first section and the second section are reconciled using the first history list and the second history list so as to maintain the first section and the second section with the same identified modifications.

In accordance with another aspect of the present invention, a method is practiced in a data processing system. A first document is provided having a first section which constitutes a grouping of data for processing by an application program and is identified by a first section identifier. A second document is provided having a second section which constitutes a grouping of data for processing by an application program and is identified by a second section identifier. It is determined whether the first section identifier and the second section identifier match. When the first section identifier and the second section identifier match, the first section and the second section are reconciled.

In accordance with an additional aspect of the present invention, a method is practiced in a data processing system. A first document is provided having a first section, which constitutes a grouping of data for processing by an application program, where the first section is identified by a first globally unique identifier. A second document is provided having a second section, which constitutes a grouping of data for processing by an application program, where the second section is identified by a second globally unique identifier. The first globally unique identifier is compared to the second globally unique identifier. When the first globally unique identifier matches the second globally unique identifier, the first section and the second section are reconciled.

In accordance with yet another aspect of the present invention, a method is practiced in a data processing system. A first document is provided with a first section which constitutes a grouping of data for processing by an application program and which has a history list. Also, a second document is provided with a second section which constitutes a grouping of data for processing by an application program and which has a history list. It is determined that the first section and the second section match. Then, using the history lists, it is determined which of the sections have been modified. Next, the user is notified of which of the sections have been modified.

In accordance with a further aspect of the present invention, a method is practiced in a data processing system. A document is provided which has a plurality of sections. Each of the sections has a history list. Each of the history lists has a plurality of version identifiers. Each of the version identifiers indicates a version of the section and is identified in a temporal order. Each of the sections also has a reconciliation indicator which indicates whether the section has been reconciled. First, user input is received requesting that the document be stored in memory. In response to the user input, for each of the sections, it is determined whether that section has been reconciled using the reconciliation indicator. When that section has not been reconciled, that section is associated with the most recent one of the version identifiers in the history list. When that section has been reconciled, if it has also been modified, a new version identifier is generated. The new version identifier is added to the history list, and that section is associated with the new version identifier.

In accordance with yet another aspect of the present invention, a method is practiced in a data processing system which includes a first document having first sections, and each of the first sections has an associated history list. Each associated history list identifies versions of the associated sections in a temporal order, where each version is associated with a set of modifications made to a section. In addition, the data processing system includes a second document having second sections, and each of the second sections has an associated history list. Each associated history list identifies versions of the associated section in a temporal order, where each version is associated with a set of modifications made to a section. Moreover, the first section matches the second section. In the data processing system, a reconciler is provided for reconciling matching sections of the first document and the second document. The reconciler includes a correlator for determining matching sections. The reconciler also includes a comparator for determining which of the matching sections has been modified. In addition, the reconciler includes an updator for updating the matching sections based on which of the matching sections has been modified and for setting a reconciliation indicator.

In accordance with yet another aspect of the present invention, a reconciliation application program is stored on a computer readable storage medium. The reconciliation application program includes a retriever for retrieving a first document and a second document. Each of the documents contains sections, where each of the sections has a section identifier and a history list. Each of the history lists has version entries which are associated with modifications to a version of the section. The reconciliation application program also includes a correlator for determining that the section identifiers match. In addition, the reconciliation application program includes a comparator for determining which of the matching sections has been modified using the version entries in each of the history lists. Furthermore, the reconciliation application program includes an updator for updating the matching sections based on which of the matching sections has been modified.

DETAILED DESCRIPTION OF THE INVENTION

A preferred embodiment of the present invention enables reconciliation of corresponding groupings of data for processing by application programs ("sections") which are contained within files ("documents"). In particular, the preferred embodiment provides a reconciliation mechanism for reconciling a first section in a first document with a corresponding second section in a second document. Each section has a history list which identifies versions of that section. Specifically, the reconciliation mechanism uses the history lists to compare versions of corresponding sections in order to determine which section has been modified. When one of the corresponding sections has been modified and the other has not been modified, the reconciliation mechanism updates the unmodified section with the modified section. When both sections have been modified, then the reconciliation mechanism provides a user with options for reconciling the sections. In addition, when one document has a new section which is not in the other document, the reconciliation mechanism adds the new section to the other document.

More specifically, when reconciling two corresponding sections, the reconciliation mechanism determines whether either or both the first section and the second section have been modified. If neither section has been modified, then no updating is needed. If only the first section has been modified, then the second section is updated based on the first section. If only the second section has been modified, then the first section is updated based on the second section. If both the first section and the second section have been modified, then the user is provided with an option of updating either section using the other section. Modifications include additions to data within a section, changes to data within a section, deletions of data within a section, or deletions of entire sections. In addition, after updating corresponding documents, the reconciliation mechanism determines which sections exist only in the first document and adds these to the second document. Then, the reconciliation mechanism determines which sections exist only in the second document and adds these to the first document.

Figure 1:
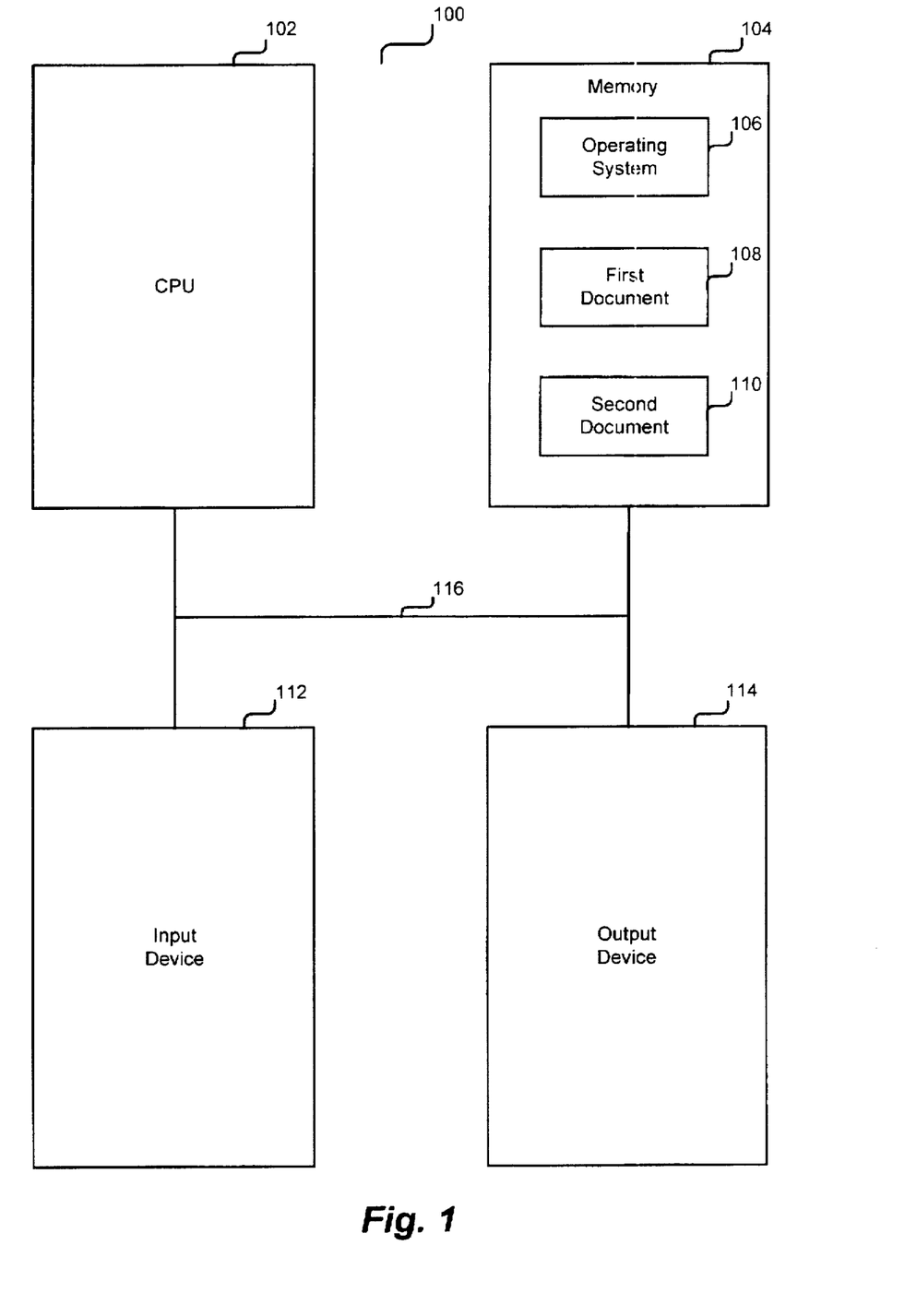
FIG. 1 is a block diagram of a computer system which is suitable for practicing the preferred embodiment of the present invention.

FIG. 1 is a block diagram of a computer system 100 which is suitable for practicing the preferred embodiment of the present invention. The computer system 100 includes a first processing unit (CPU) 102. The computer system 100 also includes a memory 104, which contains an operating system 106, a first document 108, and a second document 110. In addition, the computer system 100 includes an input device 112, such as a mouse or a keyboard. The computer system 100 additionally includes an output device 114, such as a video display. The components of the computer system 100 are connected by a connection mechanism 116, such as a bus. In the preferred embodiment of the present invention, the operating system is Windows of Microsoft Corporation, which supports the Microsoft OLE 2.01 protocol developed by Microsoft Corporation of Redmond, Washington.

The "MICROSOFT BRIEFCASE" application reconciles a "MICROSOFT BRIEFCASE" document (i.e., a first document which is maintained with this application) and a non-"MICROSOFT BRIEFCASE" document (i.e., a second document which is not maintained by this application), rather than reconciling sections of documents. The "MICROSOFT BRIEFCASE" application is sold by Microsoft Corporation of Redmond, Wash. When modifications are made to either the first document or the second document, the "MICROSOFT BRIEFCASE" application provides a method of reconciling the documents. In particular, the "MICROSOFT BRIEFCASE" application determines whether the first document or the second document has been more recently modified based on the last date and time that the documents were saved. When only one document has been modified, the updated document is copied over the corresponding document. When both documents have changed, the "MICROSOFT BRIEFCASE" application is unable to reconcile the documents and notifies the user of this.

The "MICROSOFT BINDER" application generates a "MICROSOFT BINDER" document (i.e., file) which contains sections (i.e., groupings of data for processing by application programs). Each section may be processed by the same or a different application program, such as "MICROSOFT WORD" or "MICROSOFT EXCEL." The "MICROSOFT BINDER" application is sold by Microsoft Corporation of Redmond, Wash. Each section in a "MICROSOFT BINDER" document has an associated globally unique identifier ("GUID"). A GUID is generated by calling the CoCreateGUID( ) function provided by the Microsoft OLE 2.01 protocol. A GUID is a 128-byte integer which uniquely identifies the section.

Figure 2:
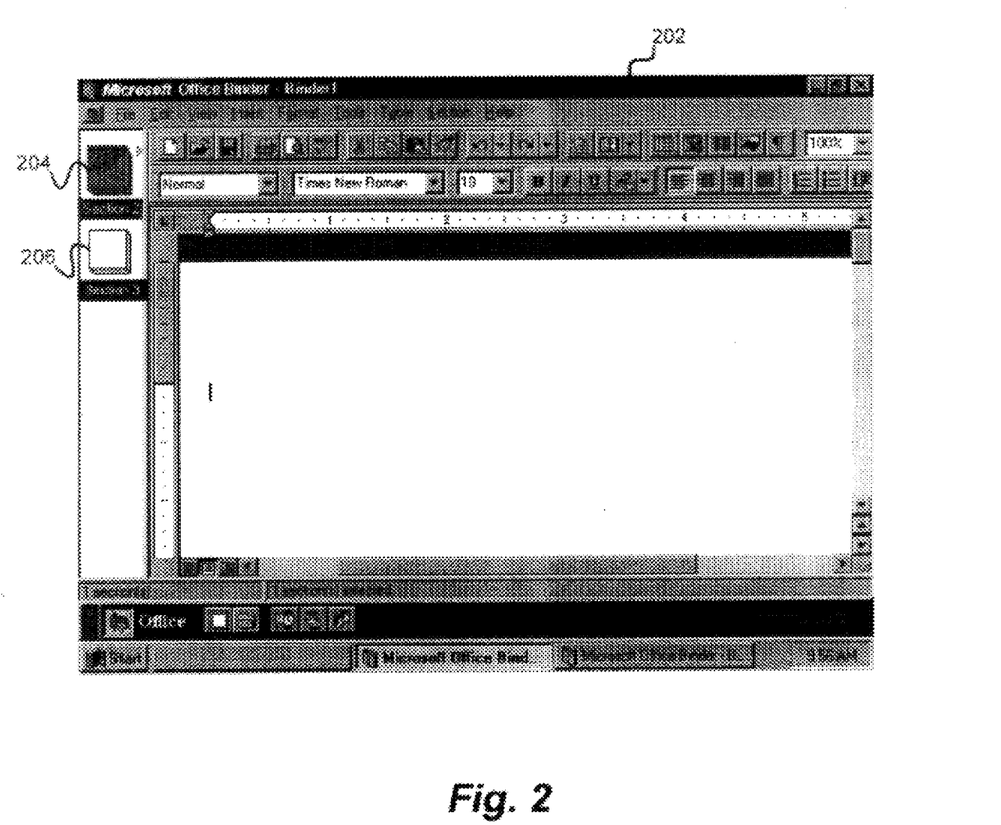
FIG. 2 illustrates a sample user interface provided by a "MICROSOFT BINDER" application for generating and editing a "MICROSOFT BINDER" document in accordance with the preferred embodiment of the present invention.

FIG. 2 illustrates a sample user interface provided by a "MICROSOFT BINDER" application for generating and editing a "MICROSOFT BINDER" document 202 in accordance with the preferred embodiment of the present invention. The "MICROSOFT BINDER" document 202 contains sections, including a "MICROSOFT WORD" document 204 and a "MICROSOFT EXCEL" worksheet 206. When two corresponding "MICROSOFT BINDER" documents are to be reconciled, the reconciliation mechanism can reconcile the corresponding sections within them.

The reconciliation mechanism enables a user to reconcile sections of "MICROSOFT BINDER" documents rather than entire documents. In particular, in a preferred embodiment, the reconciliation mechanism reconciles a first document which is a "MICROSOFT BINDER" document maintained by the "MICROSOFT BRIEFCASE" application and a second document which is a "MICROSOFT BINDER" document which is not maintained by the "MICROSOFT BRIEFCASE" application. For example, if one section in the first document were modified one day and a different section in the second document were modified the next day, the "MICROSOFT BRIEFCASE" application does not perform reconciliation. Instead, the "MICROSOFT BRIEFCASE" application notifies the user that both documents have changed and so cannot be reconciled. However, with the reconciliation mechanism, both modified sections would be in both the first and second documents. By updating sections that have changed rather than the entire document, the reconciliation mechanism enables reconciliation of two documents when different sections have been modified in the documents.

Figure 3:
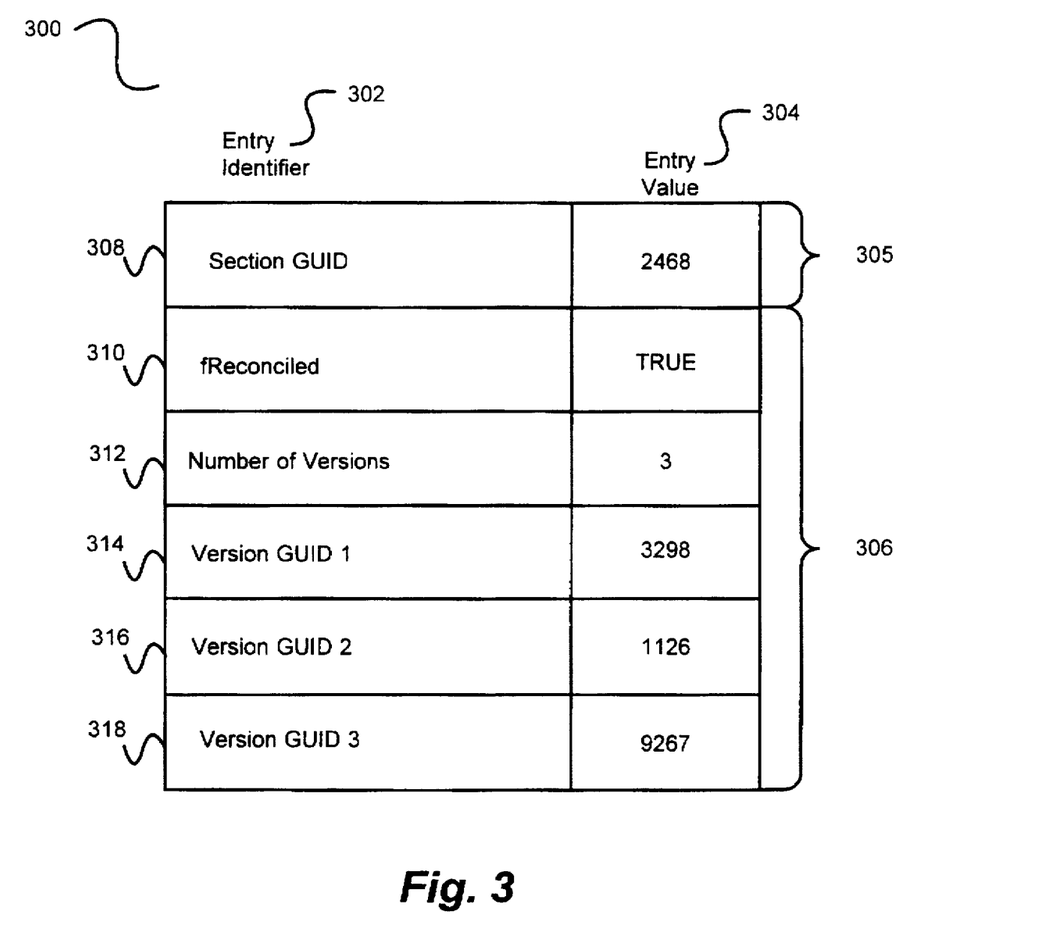
FIG. 3 illustrates a sample section identifier with an associated History List in accordance with the preferred embodiment of the present invention.

FIG. 3 illustrates a sample section identifier and its associated History List in accordance with the preferred embodiment of the present invention. Each section of a document has a section identifier 305 and a History List 306. The Section GUID entry identifier of entry 308 identifies a section with a globally unique identifier. The entry value of entry 308 is 2468. Each History List has several entries, and each entry contains an entry identifier 302 and an entry value 304. The fReconciled entry identifier (i.e., reconciliation indicator) of entry 310 indicates whether this section has already been reconciled and is used to determine whether to generate a new version GUID when saving a document, as will be discussed in further detail below. The entry value of entry 308 is set to TRUE, indicating that this section has already been reconciled. When the fReconciled entry is set to FALSE, however, it indicates that this section has not been reconciled since the last time it was saved. The Number of Versions entry identifier of entry 312 indicates the number of versions of this section which have been generated. The entry value of entry 312 indicates this section has 3 versions. The History List also contains version GUIDs (i.e., version identifiers) which identify each version of the section. For a preferred embodiment of the present invention, the most recent ten version GUIDs of a section are stored in the History List. One skilled in the art would recognize that the illustration of ten versions above is not intended to be limiting of the present invention. The version GUIDs are listed in a temporal order, with the version GUID for the most recently modified version listed as the first version GUID. For example, the Version GUID 1 entry identifier of entry 314 identifies the most recent version of this section with a globally unique identifier, which is entry value 3298. A new version GUID is generated and added to the History List when a section is modified and then saved while the fReconciled entry is TRUE. Furthermore, in each "MICROSOFT BINDER" document, there is a header portion of the document which contains information for each section, including a section identifier and History List. The grouping of data which constitutes the most recent version is also stored with the section information of the "MICROSOFT BINDER" document.

Figure 4:
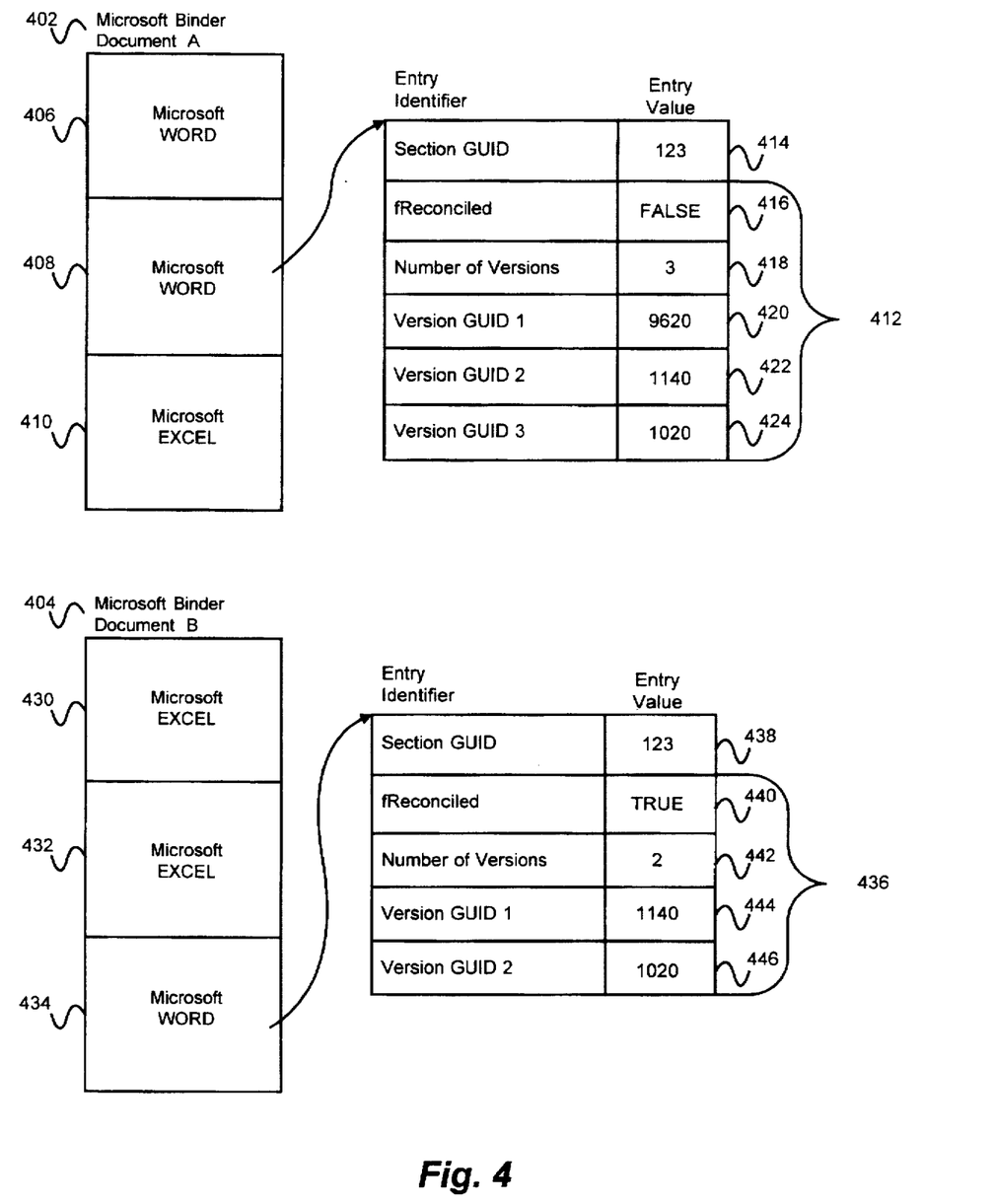
FIG. 4 illustrates sections within two "MICROSOFT BINDER" Documents before they have been reconciled in accordance with the preferred embodiment of the present invention.

FIG. 4 illustrates sections within two "MICROSOFT BINDER" Documents before they have been reconciled in accordance with the preferred embodiment of the present invention. "MICROSOFT BINDER" Document A 402 contains three sections, a "MICROSOFT WORD" section 406, another "MICROSOFT WORD" section 408, and a "MICROSOFT EXCEL" section 410. Each section contains a section identifier and an associated History List. FIG. 4 illustrates the History List 412 associated with the "MICROSOFT WORD" section 408. In addition, FIG. 4 illustrates "MICROSOFT BINDER" Document B 404 having three sections, a "MICROSOFT EXCEL" section 430, another "MICROSOFT EXCEL" section 432, and a "MICROSOFT WORD" section 434. FIG. 4 also illustrates the History List 436 for the "MICROSOFT WORD" section 434.

In performing reconciliation, the reconciliation mechanism first determines which sections correspond by comparing their section GUIDs. For example, in FIG. 4, the "MICROSOFT WORD" section 408 has a Section GUID value of 123 in the entry 414, and the "MICROSOFT WORD" section 434 has a Section GUID value of 123 in the entry 438. These sections correspond because they have the same section GUID. Then the reconciliation mechanism determines whether either or both sections have been updated by comparing Version GUIDs. In this example, the first version GUID 9620 in the entry 420 for "MICROSOFT BINDER" Document A's section is not found in the version GUID entries for the "MICROSOFT BINDER" Document B's section, which indicates that Version GUID 9620 in the entry 420 contains modifications which are not in the corresponding section. Then, the reconciliation mechanism determines that the first Version GUID 422 of "MICROSOFT BINDER" Document B's section is also the Version GUID 444 "MICROSOFT BINDER" Document B's section, indicating that the section in "MICROSOFT BINDER" Document B has not been modified since it was last reconciled with "MICROSOFT BINDER" Document A. Therefore, the reconciliation mechanism updates the "MICROSOFT BINDER" Document B's History List to add the latest version GUID and updates the "MICROSOFT BINDER" Document B's section information to include the new version.

Figure 5:
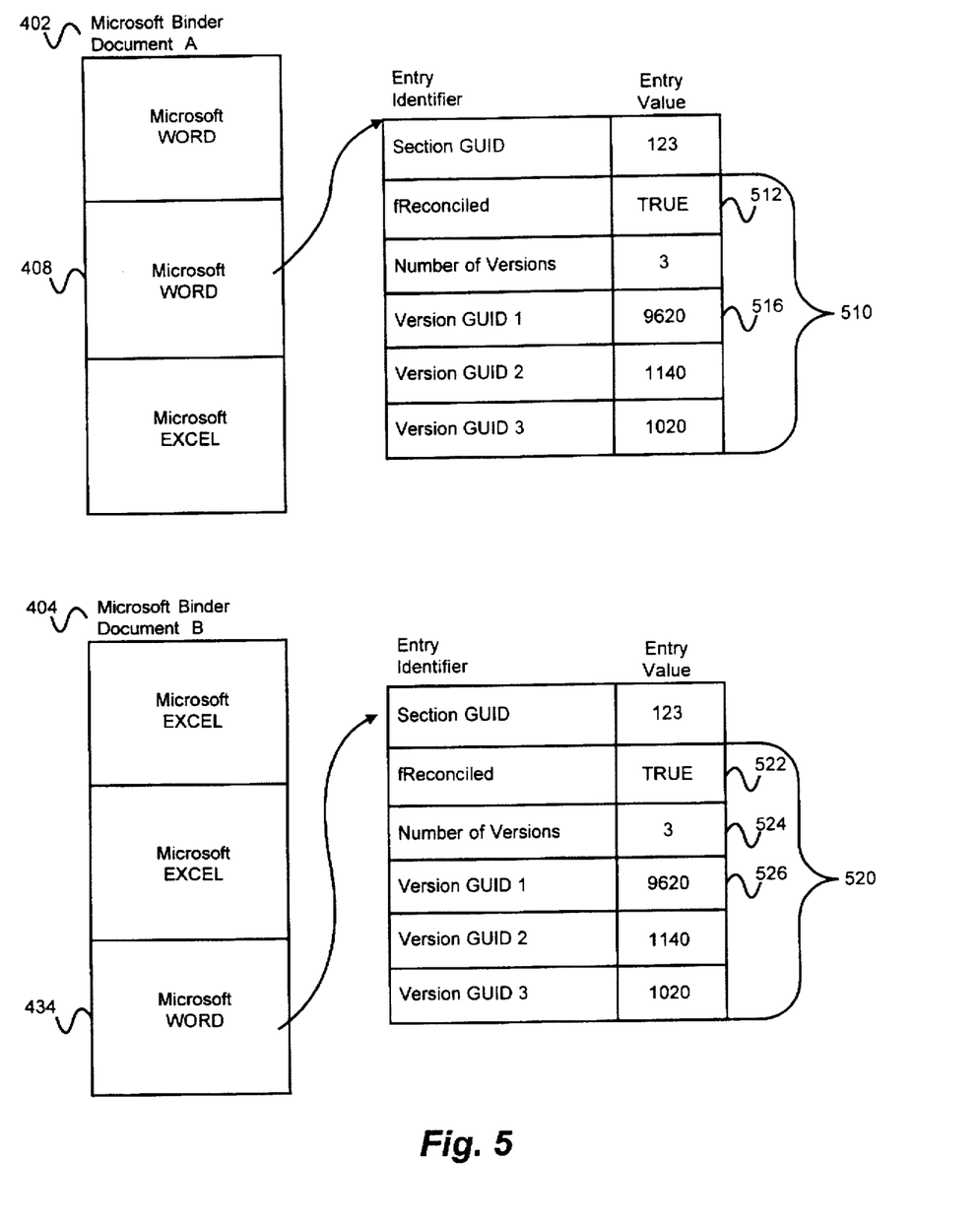
FIG. 5 illustrates sections within two "MICROSOFT BINDER" Documents after they have been reconciled in accordance with the preferred embodiment of the present invention.

FIG. 5 illustrates sections within two "MICROSOFT BINDER" Documents after they have been reconciled in accordance with the preferred embodiment of the present invention. The History List 520 for "MICROSOFT BINDER" Document B has 3 versions now, as indicated by the entry value in the entry 524. The History List 520 has a new first version entry, Version GUID 1 which has an entry value of 9620 in the 526 entry, corresponding to the entry value of 9620 in the 516 entry of the "MICROSOFT BINDER" Document A's History List 510. The original two version entries of "MICROSOFT BINDER" Document B's section's History List have been listed after the newly added version entry, indicating that they were earlier versions. Also, the reconciled entry identifier of each History List has an entry value of TRUE in the entries 512 and 522, indicating that these sections have been reconciled.

Figure 6:
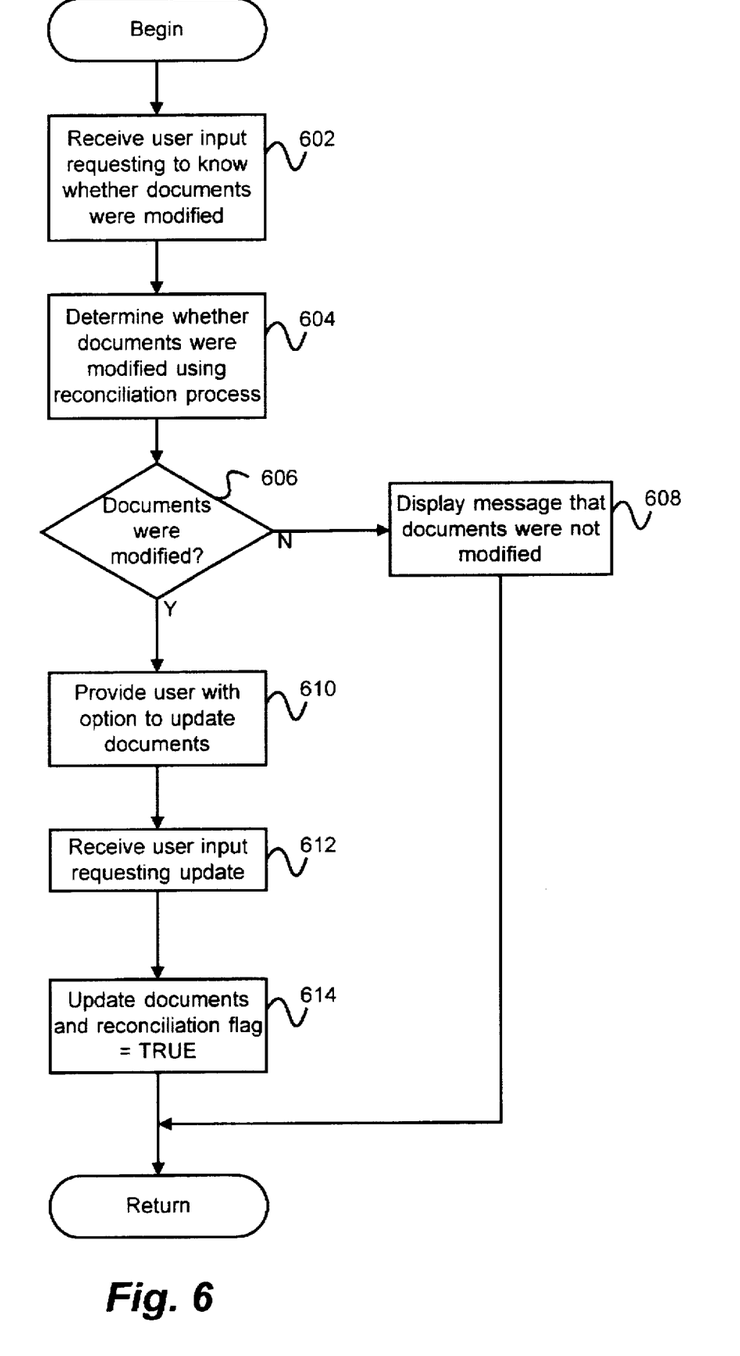
FIG. 6 is a flowchart illustrating the steps performed when the reconciliation mechanism is used in accordance with the preferred embodiment of the present invention.

FIG. 6 is a flowchart illustrating the steps performed when the reconciliation mechanism is used in accordance with the preferred embodiment of the present invention. First, the reconciliation mechanism receives user input requesting to know whether documents were modified (step 602). Then, the reconciliation mechanism uses the reconciliation process, which will be discussed in detail below, to determine whether the documents have been modified (step 604). The reconciliation process determines which sections correspond and which have been modified, as well as, which have been newly added. If the documents were not modified (step 606), then the reconciliation mechanism displays a message indicating that the documents were not modified (step 608). If the documents were modified (step 606), then the reconciliation mechanism provides the user with the results of the reconciliation process and with an option to update the documents (step 610). This allows a user to view the results of the reconciliation process before deciding whether or not to update the documents. Then, the reconciliation mechanism receives user input requesting to update the documents (step 612). Next, the reconciliation mechanism updates the sections in the documents and sets their reconciliation flags to TRUE (step 614) to indicate that these sections have been reconciled.

Figure 7:
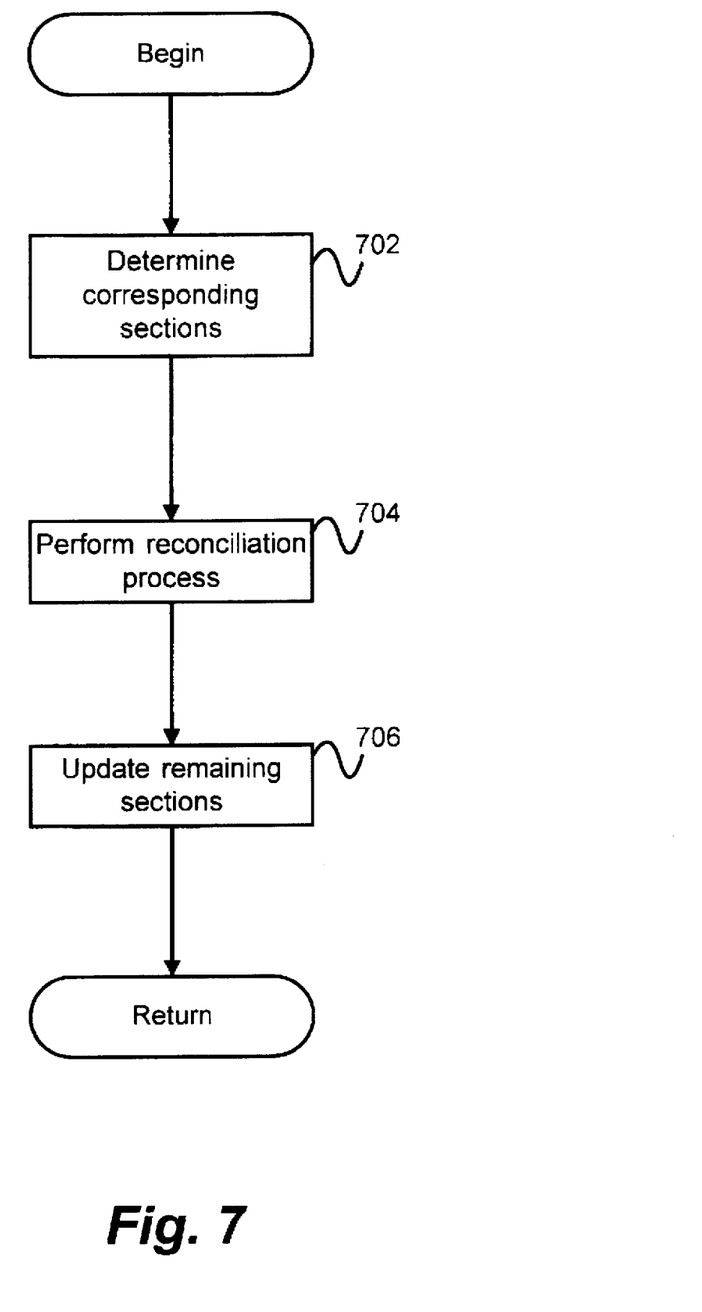
FIG. 7 is a flowchart illustrating the steps performed by the reconciliation mechanism in accordance with the preferred embodiment of the present invention.

FIG. 7 is a flowchart illustrating the steps performed by the reconciliation mechanism in accordance with the preferred embodiment of the present invention. Once the reconciliation mechanism determines that it has corresponding documents, the reconciliation mechanism determines which sections correspond in the corresponding documents (step 702). Each document has a globally unique identifier (a "document GUID") which identifies that document. Two documents correspond when they have the same document GUID. In addition, each section has a globally unique identifier (a "section GUID") which identifies that section. Two sections correspond when they have the same section GUID. Moreover, each section may have several versions. Each of the versions represents a set of modifications made to a document, such as a "MICROSOFT WORD" document. Each version has a globally unique identifier (a "version GUID") which identifies that version. Two versions correspond when they have the same version GUID. Continuing with the flow diagram of FIG. 7, after determining corresponding sections (step 702), the reconciliation mechanism performs the reconciliation process (step 704), which will be discussed below. The reconciliation process compares the versions of the sections and updates sections as is appropriate. Then, the reconciliation mechanism updates the remaining sections (step 706), which are new sections added to the documents and which do not have corresponding sections.

Figure 8:
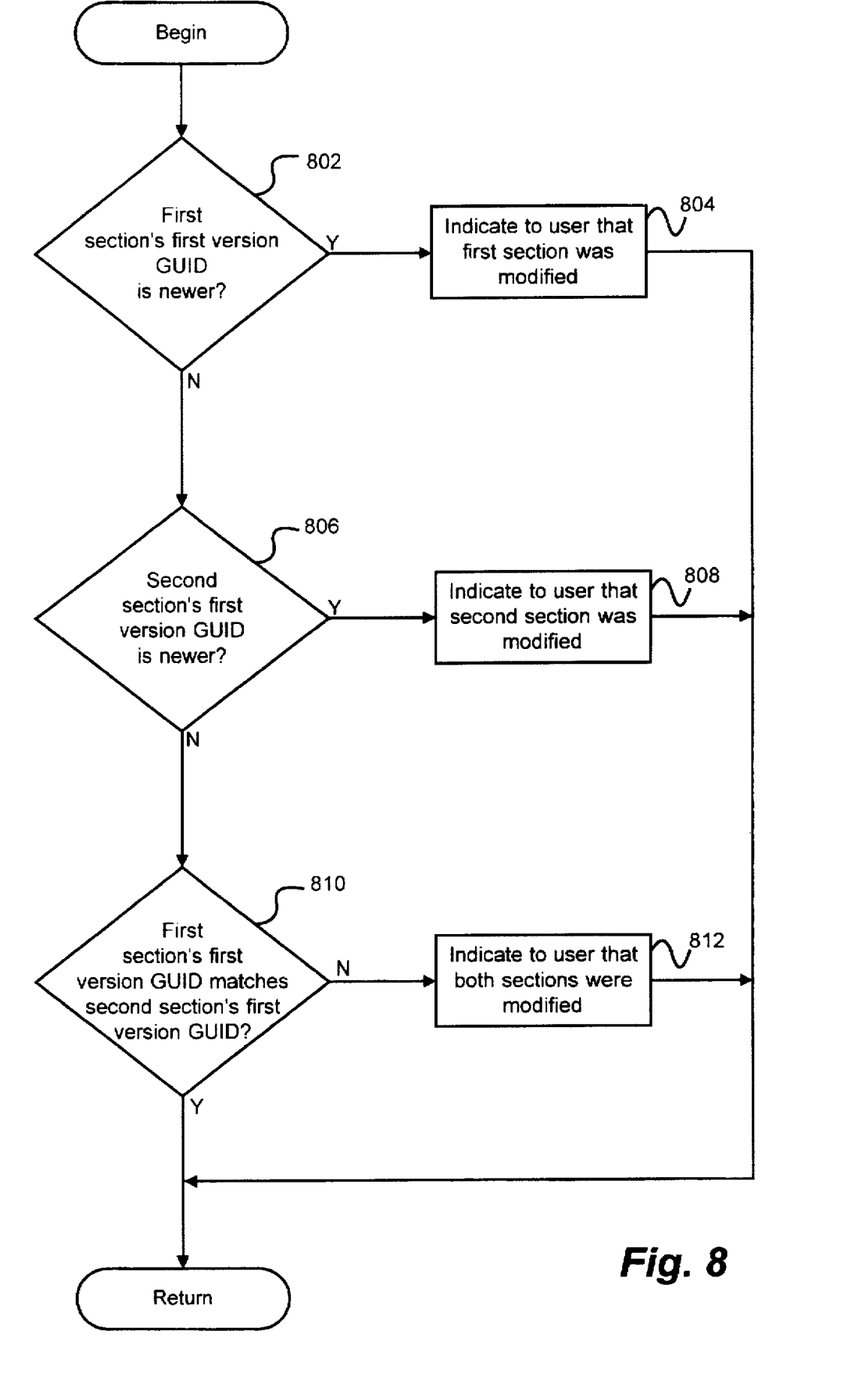
FIG. 8 is a flowchart illustrating the steps performed to reconcile a first section in a first document and a second section in a second document in accordance with the preferred embodiment of the present invention.

FIG. 8 is a flowchart illustrating the steps performed to reconcile a first section in a first document and a second section in a second document in accordance with the preferred embodiment of the present invention The reconciliation process performs reconciliation using History Lists. For each section in a document, there is an associated History List. ÿThe History List contains version entries with version GUIDs.

First, the reconciliation process determines whether only the first section has been modified (step 802). In particular, when the second section's first version GUID matches the second or higher version GUID of the first section, then the first section has been modified since the last reconciliation and the second section has not been modified since then. If only the first section has been modified, then the reconciliation process indicates to the user that the first section has been modified (step 804). Otherwise, the reconciliation process determines whether only the second section has been modified (step 806). When the first section's first version GUID matches the second or higher version GUID of the second section, then the second section has been modified since the last reconciliation and the first section has not been modified since then. When only the second section has been modified, then the reconciliation process indicates to the user that the second section has been modified (step 808). Otherwise the reconciliation process determines whether both the first section and the second section have been modified (step 810). In particular, the reconciliation process determines whether the first section's first version GUID matches the second section's first version GUID. If these match, then neither the first section nor the second section have been modified and the reconciliation process returns. Otherwise, the reconciliation process has determined that both the first section and the second section have been modified and the reconciliation process indicates to the user that both sections have been modified (step 812). When both the first section and the second section have been modified, the reconciliation mechanism provides a user with the option of either updating the first section with the second section or with updating the second section with the first section.

Figure 9:
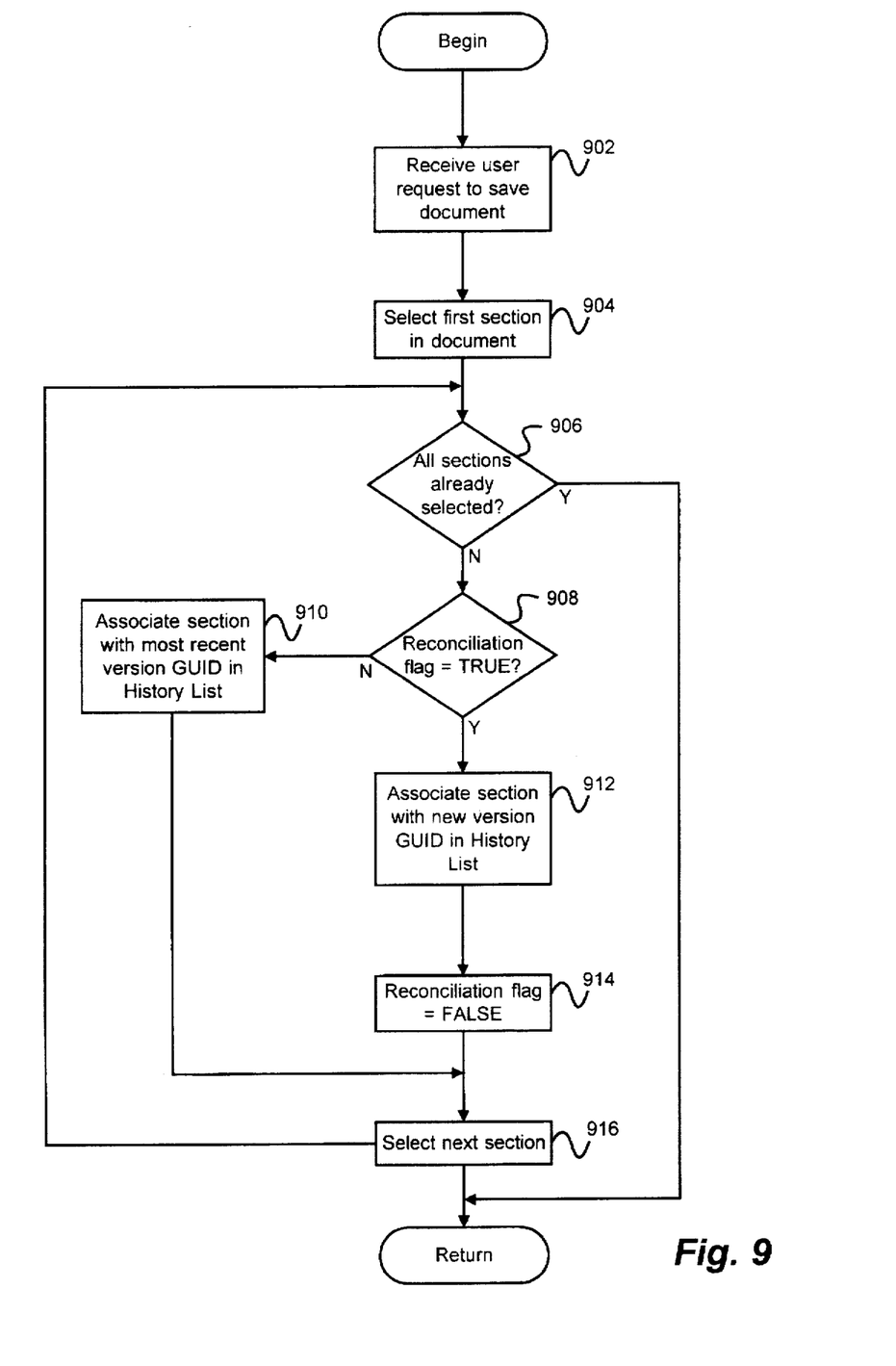
FIG. 9 is a flowchart illustrating the steps performed to use the reconciliation flag in accordance with the preferred embodiment of the present invention.

FIG. 9 is a flowchart illustrating the steps performed to use the reconciliation flag in accordance with the preferred embodiment of the present invention. First, a request is received from the user to save a document (step 902). Next, the first section in the document is selected (step 904). Then it is determined whether all sections have already been selected (step 906). When all sections have already been selected, the reconciliation mechanism returns. Otherwise, it is determined whether the reconciliation flag is set to TRUE or to FALSE (step 908). If the reconciliation flag is set to FALSE, the section has not been reconciled since the last time it was saved. When the reconciliation flag is set to FALSE, the selected section is associated with the most recent version GUID in the History List (step 910). By not generating a new version GUID when reconciliation has not occurred, the reconciliation mechanism saves time and memory. Otherwise, when the reconciliation flag is set to TRUE, the selected section is associated with a newly generated version GUID which is added to the History List (step 912). Then the reconciliation flag is set to FALSE (step 914) to indicate that the latest version of this section has not been reconciled. After this, the next section is selected for processing (step 916).

In summary, the reconciliation mechanism provides efficient reconciliation of large documents by updating sections which have been modified rather than by copying an entire document in place of another. In addition, the reconciliation mechanism provides the results of the reconciliation process to a user and allows the user to determine whether or not the updates should be performed. This enables a user to review the results of the reconciliation process before deciding whether to update documents. Moreover, using a reconciliation flag, the reconciliation mechanism determines whether or not to generate a new version of a section, which maintains the History List at a minimum required size. Furthermore, the reconciliation mechanism enables reconciliation when different sections of two documents are modified.

Although the methods and systems of the present invention have been described in terms of a preferred embodiment, it is not intended that the invention be limited to this embodiment. Modifications within the spirit of the invention will be apparent to those skilled in the art. For example, although the preferred embodiment discussed above indicates that a user requests reconciliation, the reconciliation may be automatically performed. In addition, although the preferred embodiment has been discussed using a first document processed by the "MICROSOFT BRIEF-CASE" application and a second document which is not processed by this application, any document may be reconciled with another using the present invention. For example, a central document and a local document on a network may be reconciled. Moreover, when both a first section and a second section have been modified, it is possible that another reconciliation process may be used to reconcile those sections rather than updating one with the other. The scope of the present invention is defined only by the claims that follow.

I claim:

1. In a data processing system having a memory, a method comprising the computer-implemented steps of:

providing first and second documents, each document having a plurality of corresponding sections, each section having a history list maintained within its respective document, the history list having at least one version identifiers, the version identifier indicating a version of the section, and each section having a reconciliation indicator which indicates whether the section has been reconciled;

receiving user input requesting that the first document be stored in the memory; and in response to the user input, for each of the sections, determining whether that one of the sections has been reconciled using the reconciliation indicator;

when that one of the sections has not been reconciled, associating that one of the sections with the most recent one of the version identifiers in the memory; and when that one of the sections has been reconciled and has been modified, generating a new version identifier; adding the generated new version identifier to the history list; and associating that one of the sections with the generated new version identifier in the history list.

2. In a data processing system, a method comprising the computer-implemented steps of:

providing a first document containing a first section which constitutes a grouping of data for processing by an application program;

providing a first history list that is associated with the first section and which identifies modifications made in the first section;

providing a second document containing a second section which constitutes a grouping of data for processing by an application program;

providing a second history list that is associated with the second section and which identifies modifications made in the second section; and reconciling the first section and the second section using the first history list and the second history list so as to maintain the first section and the second section with the same identified modifications.

3. The method as recited in claim 2, wherein the first history list includes version entries, each of the version entries associated with a set of modifications to the first section, and wherein the second history list includes version entries, each of the version entries associated with a set of modifications to the second section, and wherein the step of reconciling the first section and the second section using the first history list and the second history list so as to maintain the first section and the second section with the same identified modifications includes the steps of:

comparing the version entries of the first history list with the version entries of the second history list;

when the comparing of the version entries of the first history list with the version entries of the second history list indicates that only the first section has been modified, automatically updating the second section to reflect the modifications made in the first section;

when the comparing of the version entries of the first history list with the version entries of the second history list indicates that only the second section has been modified, automatically updating the first section to reflect the modifications made in the second section; and when the comparing of the version entries of the first history list with the version entries of the second history list indicates that both the first section and the second section have been modified, providing a user with an option of updating the first section to reflect the modifications made in the second section or updating the second section to reflect the modifications made in the first section.

4. In a data processing system, a method comprising the computer-implemented steps of:

providing a first document having a first section which constitutes a grouping of data for processing by an application program and is identified by a first section identifier;

providing a second document having a second section which constitutes a grouping of data for processing by an application program and is identified by a second section identifier;

determining whether the first section identifier and the second section identifier match; and when the first section identifier and the second section identifier match, reconciling the first section and the second section.

5. The method as recited in claim 4 wherein before the step of determining whether the first section identifier and the second section identifier match, determining that the first document and the second document match.

6. The method as recited in claim 4, wherein the step of when the first section identifier and the second section identifier match, reconciling the first section and the second section further comprises:

determining whether the first section or the second section was modified;

when the first section was modified and the second section was not modified, automatically updating the second section to reflect modifications made to the first section;

when the second section was modified and the first section was not modified, automatically updating the first section to reflect the modifications made to the second section; and when both the first section and the second section were modified, providing a user with an option of updating either the first section to reflect modifications made to the second section or the second section to reflect modifications made to the first section.

7. The method as recited in claim 4, wherein the first document has only the first section and the second document has only the second section, further comprising:
when the first section identifier and the second section identifier do not match,
updating the first document to include the second section; and
updating the second document to include the first section.

8. In a data processing system, a method comprising the computer-implemented steps of:
providing a first document having a first section which constitutes a grouping of data for processing by an application program, the first section being identified by a first globally unique identifier;
providing a second document having a second section which constitutes a grouping of data for processing by an application program, the second section being identified by a second globally unique identifier;
comparing the first globally unique identifier with the second globally unique identifier; and
when the first globally unique identifier matches the second globally unique identifier, reconciling the first section and the second section.

9. In a data processing system, a method comprising the computer-implemented steps of:
providing a first document with a first section which constitutes a grouping of data for processing by an application program, the first section having a history list;
providing a second document with a second section which constitutes a grouping of data for processing by an application program, the second section having a history list;
determining that the first section and the second section match;
determining which of the sections have been modified using the history lists; and
notifying a user which of the sections have been modified.

10. The method as recited in claim 9, wherein the first document contains only the first section and the second document contains only the second section, further comprising:
when the first section and the second section do not match,
providing an indication to the user that the first section is not included in the second document; and
providing an indication to the user that the second section is not included in the first document.

11. The method as recited in claim 9, wherein the first history list further comprises a plurality of version identifiers in temporal order associated with modification versions of the first section, and the second history list further comprises a plurality of version identifiers in temporal order associated with modification versions of the second section.

12. The method as recited in claim 11, wherein the step of determining which of the sections have been modified further comprises:
comparing a highest order version identifier in the plurality of version identifiers in the first history list with the plurality of version identifiers in the second history list;
when the highest order version identifier in the plurality of version identifiers in the first history list matches a version identifier other than a highest order version identifier in the plurality of version identifiers in the second history list;
automatically updating the first section to reflect modifications made in the second section.

13. The method as recited in claim 11, wherein the step of determining which of the sections have been modified further comprises:
comparing a highest order version identifier in the plurality of version identifiers in the first history list with the plurality of version identifiers in the second history list;
when the highest order version identifier in the first history does not match a version identifier in the second history list;
automatically updating the second section to reflect modifications made in the first section.

14. The method as recited in claim 9, wherein the notifying step only occurs if the determining which of the sections have been modified step determines that both the first section and the second section have been modified.

15. The method as recited in claim 9, wherein the first history list further comprises a reconciliation identifier for indicating that the first section has not been saved since the last time it was reconciled, and the second history list further comprises a reconciliation identifier for indicating that the second section has not been saved since the last time it was reconciled.

16. The method as recited in claim 9, wherein the step of determining which of the sections have been modified further comprises testing the reconciliation indicators in the first and second history lists.

17. The method as recited in claim 9, wherein the notifying step further comprises:
when the reconciliation indicator of the first history list and the reconciliation indicator of the second history list are both false, prompting the user to choose which of the first and second sections to update;
when the reconciliation indicator of the first history list is false, and the reconciliation indicator of the second history list is true, updating the second section to reflect changes made to the first section.

18. A data processing system, comprising:
a first document having first sections, each of the first sections having an associated history list, each associated history list identifying versions of the associated section in a temporal order, each of the versions being associated with a set of modifications made to a section;
a second document having second sections, each of the second sections having an associated history list, each associated history list identifying versions of the associated section in a temporal order, each of the versions being associated with a set of modifications made to a section, the second section matching the first section;
a reconciler for reconciling matching sections of the first document and the second document, the reconciler comprising:
a correlator for determining matching sections;
a comparator for determining which of the matching sections has been modified;
an updator for updating matching sing sections based on which of the matching sections has been modified and for setting a reconciliation indicator.

19. A computer-readable storage medium, upon which is stored a reconciliation application program, the reconciliation application program comprising:

a retriever for retrieving a first document and a second document, each of the documents containing sections, each of the sections having section identifiers and history lists, each of the history lists having version entries associated with modifications to a version of that section;

a correlator for determining that the section identifiers match;

a comparator for determining which of the matching sections has been modified using the version entries in each of the history lists; and an updator for updating the matching sections based on which of the matching sections has been modified.

* * * * *

UNITED STATES PATENT AND TRADEMARK OFFICE
CERTIFICATE OF CORRECTION

PATENT NO. : 5,758,358

DATED : May 26, 1998

INVENTOR(S) : David S. Ebbo

It is certified that error appears in the above-identified patent and that said Letters Patent is hereby corrected as shown below:

column 9, line number 28, claim number 1 as follows:
Delete [identifiers] and insert in place thereof --identifier-- column 12, line number 32, claim number 17 as follows:
Delete [9] and insert in place thereof --16-- column 12, line number 62, claim number 18 as follows:
After "updating", please insert --the-- column 12, line number 62, claim number 18 as follows:
After "matching", please delete [sing]

Signed and Sealed this

Twenty-fifth Day of May, 1999

Attest:

Q. TODD DICKINSON

*Attesting Officer*     *Acting Commissioner of Patents and Trademarks*